United States Patent
Araújo et al.

(10) Patent No.: US 11,217,030 B2
(45) Date of Patent: Jan. 4, 2022

(54) DETERMINING A CONTENT POSE OF A PIECE OF VIRTUAL CONTENT

(71) Applicant: Telefonaktiebolaget LM Ericsson (publ), Stockholm (SE)

(72) Inventors: José Araújo, Stockholm (SE); Zeid Al-Husseiny, Järfälla (SE); Lars Andersson, Solna (SE); Aitor Hernandez Herranz, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/954,108

(22) PCT Filed: Dec. 15, 2017

(86) PCT No.: PCT/EP2017/083074
§ 371 (c)(1),
(2) Date: Jun. 15, 2020

(87) PCT Pub. No.: WO2019/114986
PCT Pub. Date: Jun. 20, 2019

(65) Prior Publication Data
US 2021/0183149 A1   Jun. 17, 2021

(51) Int. Cl.
*G06T 19/00* (2011.01)
*G06T 7/70* (2017.01)
(Continued)

(52) U.S. Cl.
CPC ............ *G06T 19/006* (2013.01); *G06F 3/011* (2013.01); *G06T 7/20* (2013.01); *G06T 7/70* (2017.01)

(58) Field of Classification Search
CPC . G06T 19/006; G06T 7/70; G06T 7/20; G06F 3/011
See application file for complete search history.

(56) References Cited

U.S. PATENT DOCUMENTS

| 2012/0306850 A1 | 12/2012 | Balan et al. |
| 2014/0063060 A1 | 3/2014 | Maciocci et al. |

(Continued)

OTHER PUBLICATIONS

International Search Report and Written Opinion issued in International Application No. PCT/EP2017/083074 dated Aug. 23, 2018 (10 pages).

(Continued)

*Primary Examiner* — Chong Wu
(74) *Attorney, Agent, or Firm* — Rothwell, Figg, Ernst & Manbeck, P.C.

(57) ABSTRACT

It is provided a method for determining a content pose of a piece of virtual content. The method is performed in a pose determiner and comprises the steps of: acquiring a first anchor pose of the anchoring device; determining a first content pose, being a pose of a piece of virtual content, in relation to the first anchor pose; storing the first content pose in relation to the first anchor pose; determining that a user device needs to determine a content pose of the piece of virtual content; acquiring a second anchor pose of the anchoring device; retrieving the stored first content pose; determining a second content pose of the piece of virtual content based on the first content pose and the second anchor pose; and rendering the piece of virtual content in the second content pose on a user device comprising a display.

20 Claims, 4 Drawing Sheets

(51) Int. Cl.
*G06F 3/01* (2006.01)
*G06T 7/20* (2017.01)

(56) References Cited

U.S. PATENT DOCUMENTS

2015/0317832 A1   11/2015  Ebstyne et al.
2018/0126553 A1*   5/2018  Corkum ................ B25J 9/1697
2018/0185100 A1*   7/2018  Weinstein ............. A61B 34/20

OTHER PUBLICATIONS

"Coordinate Systems", https://developer.microsoft.com/en-US/windows/mixed-reality/coordinate_systems#handling_tracking_errors2.3, Dec. 15, 2017 (2 pages).

* cited by examiner

DETERMINING A CONTENT POSE OF A PIECE OF VIRTUAL CONTENT

CROSS REFERENCE TO RELATED APPLICATION(S)

This application is a 35 U.S.C. § 371 National Stage of International Patent Application No. PCT/EP2017/083074, filed Dec. 15, 2017, designating the United States.

TECHNICAL FIELD

The invention relates to a method, pose determiners, a computer program and a computer program product for determining a content pose of a piece of virtual content.

BACKGROUND

Mixed reality (MR) is foreseen to become an integral technology in the networked society and potently disrupt the consumer electronics market. Mixed reality encompasses Augmented Reality (AR) and Augmented Virtuality (AV).

AR is here used to denote the concept of presenting a combination of real-world objects and computer-rendered content to a user. Specifically, one implementation of AR implies layering one or more virtual objects in front of reality, on a user's view of the world via a see-through Head Mounted Display (HMD). One application of AR is to allow users to see and interact remotely and in 3D (three dimensions), as if each participant share the same physical space. Hence, remote communication and interaction could become as natural as face-to-face communication. In AV, the user sees real-world objects as captured by an HMD camera, and subsequently presented on the display together with computer-rendered content. Hence, in AV, the display is non see-through.

In 2016, Microsoft launched Hololens, a mobile AR HMD. Several other HMDs are being launched by other companies including Meta and Magic Leap, which are set to improve the AR technology even further.

In Virtual reality (VR) a user is immersed in a virtual environment where all content is virtual. Some of VR applications are gaming, 360 degree live video consumption of concerts, sports, etc., educational and training purposes, among others. VR content is displayed via a non-see-through HMD as, e.g., the Oculus Rift, HTC Vive, Google Daydream or Samsung GearVR.

When a piece of virtual content for MR or VR is to be placed in view for a user, this piece of virtual content is placed in a content pose. Pose defines both position (in three dimensions) and orientation (in three dimensions).

In the prior art, in devices such as the Microsoft HoloLens or Google Tango, the virtual content is stored and attached to certain visual features (spatial anchors) that the devices can detect using a camera of the device. When the user returns to the same location, a visual search and matching is performed to relate the current visual features observed by the device's camera and the previously stored visual features. A problem with such a solution is that it is very computationally intensive, as the device must inspect the environment (using several cameras as is the case with the Hololens), and perform detailed image analysis to infer specific visual features and perform the matching, which comprises content from all previously visited locations. This requires a significant amount of processing power and thus battery drain.

SUMMARY

It is an object to provide a more efficient way to determine a pose of virtual content.

According to a first aspect, it is provided a method for determining a content pose of a piece of virtual content. The method is performed in a pose determiner and comprises the steps of: acquiring a first anchor pose of the anchoring device; determining a first content pose, being a pose of a piece of virtual content, in relation to the first anchor pose; storing the first content pose in relation to the first anchor pose; determining that a user device needs to determine a content pose of the piece of virtual content; acquiring a second anchor pose of the anchoring device; retrieving the stored first content pose; determining a second content pose of the piece of virtual content based on the first content pose and the second anchor pose; and rendering the piece of virtual content in the second content pose on a user device comprising a display.

The method may further comprise the steps of: acquiring a pose uncertainty indicator, indicating a degree of uncertainty of the pose of the anchoring device: and determining a second content pose based on visual features captured by a camera of the user device, the visual features being matched with corresponding stored feature poses. In such a case, the step of determining a second content pose based on the first content pose is performed when the uncertainty indicator is less than a threshold value; and the step of determining a second content pose based on visual features is performed when the uncertainty indicator is greater than the threshold value.

The threshold value may depend on the piece of virtual content.

The method may further comprise the step of: adjusting the threshold based on an identified repositioning of the piece of virtual content.

The method may further comprise the step of: acquiring a movement flag indicating that the anchoring device has moved since capturing of the first anchor pose. In such a case, a determination of whether to perform the step of determining a second content based on the first content pose or the step of determining a second content based on visual features, is based also on the movement flag.

The method may further comprise the steps of: acquiring a movement flag indicating that the anchoring device has moved since capturing of the first anchor pose; and determining a second content pose based on visual features captured by a camera of the user device, the visual features being matched with corresponding stored feature poses. In such a case, the step of determining a second content pose based on the first content pose is performed when the movement flag indicates no movement; and the step of determining a second content pose based on visual features is performed when the movement flag indicates movement.

The step of acquiring a first anchor pose may comprise receiving the first anchor pose in a coordinate system of the anchoring device, and determining the first anchor pose in a coordinate system of the user device; the step of storing the first content pose may comprise determining the first content pose in the coordinate system of the anchoring device prior to storing; the step of acquiring the second anchor pose may comprise receiving the second anchor pose in a coordinate system of the anchoring device; and the step of determining a second content pose may comprise determining the pose of the anchoring device in the coordinate system of the user device.

According to a second aspect, it is provided a pose determiner for determining a content pose of a piece of virtual content. The pose determining comprises: a processor; and a memory storing instructions that, when executed by the processor, cause the pose determiner to: acquire a first anchor pose of the anchoring device; determine a first content pose, being a pose of a piece of virtual content, in relation to the first anchor pose; store the first content pose in relation to the first anchor pose; determine that a user device needs to determine a content pose of the piece of virtual content; acquire a second anchor pose of the anchoring device; retrieve the stored first content pose; determine a second content pose of the piece of virtual content based on the first content pose and the second anchor pose; and render the piece of virtual content in the second content pose on a user device comprising a display.

The pose determiner may further comprise instructions that, when executed by the processor, cause the pose determiner to: acquire a pose uncertainty indicator, indicating a degree of uncertainty of the pose of the anchoring device: and determine a second content pose based on visual features captured by a camera of the user device, the visual features being matched with corresponding stored feature poses. In such a case, the instructions to determine a second content pose based on the first content pose are executed when the uncertainty indicator is less than a threshold value; and the instructions to determine a second content pose based on visual features are executed when the uncertainty indicator is greater than the threshold value.

The threshold value may depend on the piece of virtual content.

The pose determiner may further comprise instructions that, when executed by the processor, cause the pose determiner to: adjust the threshold based on an identified repositioning of the piece of virtual content.

The pose determiner may further comprise instructions that, when executed by the processor, cause the pose determiner to: acquire a movement flag indicating that the anchoring device has moved since capturing of the first anchor pose. In such a case, a determination of whether to execute the instructions to determine a second content based on the first content pose or to the instructions to determine a second content based on visual features, is based also on the movement flag.

The pose determiner may further comprise instructions that, when executed by the processor, cause the pose determiner to: acquire a movement flag indicating that the anchoring device has moved since capturing of the first anchor pose; and determine a second content pose based on visual features captured by a camera of the user device, the visual features being matched with corresponding stored feature poses. In such a case, the instructions to determine a second content pose based on the first content pose are executed when the movement flag indicates no movement; and the instructions to determine a second content pose based on visual features are executed when the movement flag indicates movement.

The instructions to acquire a first anchor pose may comprise instructions that, when executed by the processor, cause the pose determiner to receive the first anchor pose in a coordinate system of the anchoring device, and determining the first anchor pose in a coordinate system of the user device; the instructions to store the first content pose may comprise instructions that, when executed by the processor, cause the pose determiner to determine the first content pose in the coordinate system of the anchoring device prior to storing; the instructions to acquire the second anchor pose may comprise instructions that, when executed by the processor, cause the pose determiner to receive the second anchor pose in a coordinate system of the anchoring device; and the instructions to determine a second content pose may comprise instructions that, when executed by the processor, cause the pose determiner to determine the pose of the anchoring device in the coordinate system of the user device.

According to a third aspect, it is provided a pose determiner comprising: means for acquiring a first anchor pose of the anchoring device; means for determining a first content pose, being a pose of a piece of a piece of virtual content, in relation to the first anchor pose; means for storing the first content pose in relation to the first anchor pose; means for determining that a user device needs to determine a content pose of the piece of virtual content; means for acquiring a second anchor pose of the anchoring device; means for retrieving the stored first content pose; means for determining a second content pose of the piece of virtual content based on the first content pose and the second anchor pose; and means for rendering the piece of virtual content in the second content pose on a user device comprising a display.

According to a fourth aspect, it is provided a computer program for determining a content pose of a piece of virtual content. The computer program comprises computer program code which, when run on a pose determiner causes the pose determiner to: acquire a first anchor pose of the anchoring device; determine a first content pose, being a pose of a piece of virtual content, in relation to the first anchor pose; store the first content pose in relation to the first anchor pose; determine that the user device needs to determine a content pose of the piece of virtual content; acquire a second anchor pose of the anchoring device; retrieve the stored first content pose; determine a second content pose of the piece of virtual content based on the first content pose and the second anchor pose; and render the piece of virtual content in the second content pose on a user device comprising a display.

According to a fifth aspect, it is provided a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein are based on exploiting external devices, denoted anchoring devices, having pose data to determine content pose for a piece of virtual content. More specifically, the content pose of a piece of virtual content is first anchored in relation to (i.e. its position is determined in relation to) an anchoring device, in a room or other well-defined physical space, and stored. Subsequently, when the space is re-entered, by obtaining a current position of the anchoring device, the current content pose can be determined based on the stored content pose and the current position of the anchoring device. When the content pose is determined in this way, the resource intensive visual feature matching is not needed, thus reducing resource usage and time required for determining the content pose.

Figure 1:
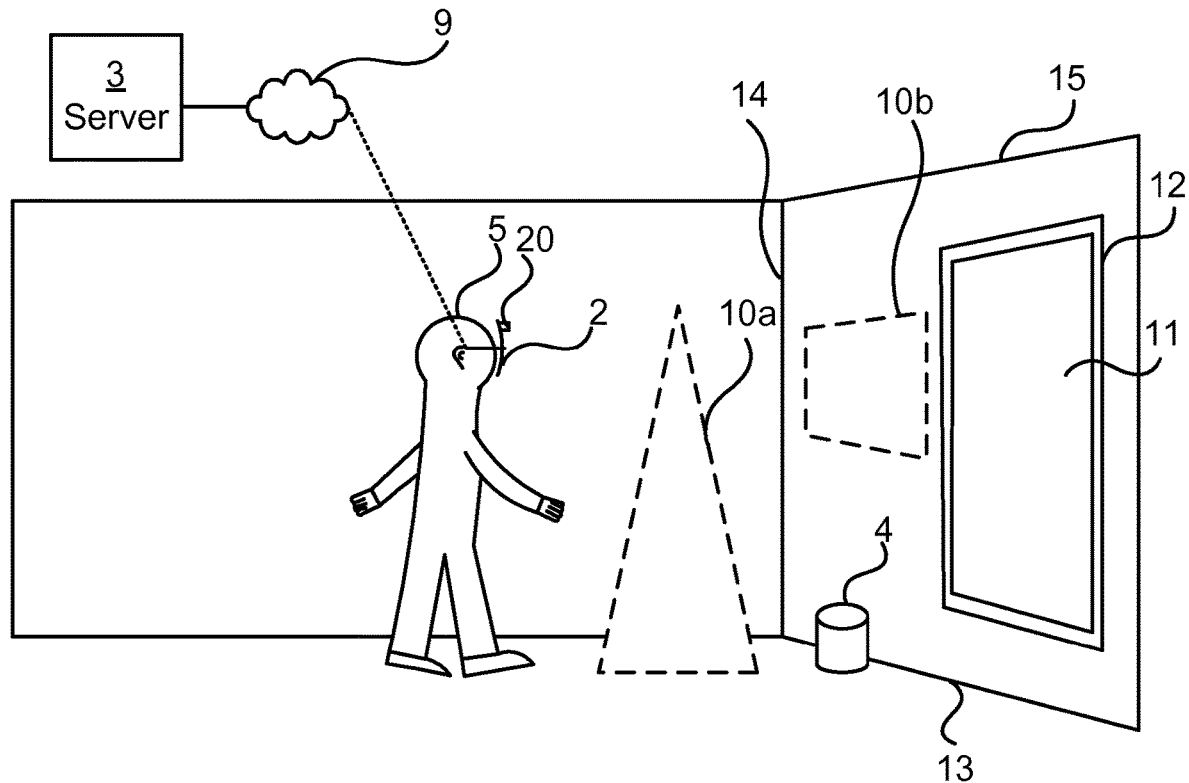
FIG. 1 is a schematic diagram illustrating an environment in which embodiments presented herein can be applied.

FIG. 1 is a schematic diagram illustrating an environment in which embodiments presented herein can be applied. The environment shown in FIG. 1 is used for MR or VR, where a user 5 wears a user device 2, such as a head mounted display (HMD). When used for MR, the user device 2 allows the user 5 to see both real-world objects 11-15 and virtual objects 10a-10b. A first virtual object 10a is a virtual Christmas tree. A second virtual object 10b is a virtual screen, e.g. for showing pictures, video streams or playing games.

When used for VR, the user device 2 allows the user 5 to only see virtual objects 10a-10b. The user device 2 contains sensors (e.g. accelerometers, gyros, etc.) e.g. as part of an inertia measurement unit (IMU). This is used by the user device to determine the position and orientation of the user device 2 in a three dimensional space. The position and orientation are collectively known as pose. Poses are herein referred to as P(i, j), where i is a label of the element and j is a label of coordinate system. The pose is a 6-element vector, comprising a 3D position (x,y,z) and orientation (roll, pitch, yaw).

The user device 2 comprises one or more cameras 20 for capturing images of the environment around the user 5. Each camera 20 can be in the visible light range (also known as RGB, red green blue) and/or the infrared range, and can even be thermal cameras.

The user device 2 is connected to a network 9. The network 9 can e.g. be a local area network (LAN) and/or a wide area network (WAN) such as the Internet. The connection between the user device 2 and the network 9 can be based on wireless technology, such as WiFi (any of the IEEE 802.11x standards), Bluetooth, etc. Alternatively or additionally, the connection between the user device 2 and the network is based on a cellular network connection, e.g. complying with any one or a combination of 5G NR (New Radio), LTE (Long Term Evolution), LTE-Advanced, W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network. A server 3 is also connected to the network 9.

In the vicinity of the user, there is an anchoring device 4. The anchoring device 4 is an electronic device which is capable of determining its pose (e.g. with the assistance of an IMU) and can communicate its pose to other devices. The anchoring device 4 can have other main purposes than acting as an anchoring device. For instance, the anchoring device 4 can be implemented as a smart speaker, a computer, a smart lamp, a smart fridge, a smart washing machine, a smart coffee machine, etc. There may be more than one anchoring devices 4. Each anchoring device 4 can be an essentially static device, such as a smart fridge or a smart washing machine, or a more movable device, such as a personal digital assistant or a smart speaker. In such a situation, a static device can be preferred.

Around the user, there are several visual elements, such as a door it, and a doorframe 12. Moreover, there are additional visual elements such as a floor line 13, a corner 14 between walls, and a ceiling line 15.

When visual features are used for pose determination, complementing pose determination using the anchoring device 4, environment data (two-dimensional or three-dimensional) is obtained from storage of the user device 2 and/or the server 3. Key elements are identified in images captured to and compared with the environment data to allow the user device 2 to be positioned within the environment, optionally also using data from the IMU. The key elements can be any subset (or all) of the visual elements 11-15. It is to be noted that the visual elements vary depending on where the user 5 is located. Mapping can also occur simultaneously, whereby the environment data is updated. A process of learning an area while keeping track of a current position and orientation of a user within the area is known as Simultaneous Localisation and Mapping, or SLAM.

The user device 2 can e.g. be implemented using an HMD such as the Microsoft HoloLens, or ODG R7/R8/R9. The HMD may also be an Oculus Rift or HTC Vive for VR applications. It is also possible that the user device 2 is implemented using another type of wearable device, a smartphone and/or a tablet computer, optionally with optical enhancement, e.g. Google cardboard, Mira Prism or similar. The user device 2 could be also a smartphone such as the Google Tango phone (Lenovo and Asus) or an iPhone or Android phone with ARKit (from Apple) or ARCore (from Google). It is to be noted that the term 'computer' used herein is to be interpreted as any electronic device with digital processing capabilities, regardless of size. Hence, the term computer comprises devices such as servers, desktop computers, laptop computers, tablet computers, smart phones, mobile phones, smart watches, microcontrollers, etc.

It is to be noted that the environment of FIG. 1 is only one example of where embodiments presented herein can be applied. Embodiments presented herein can equally well be applied in other environments such as for self-driving vehicles, industrial applications, indoor robotics, etc.

Figure 2A:
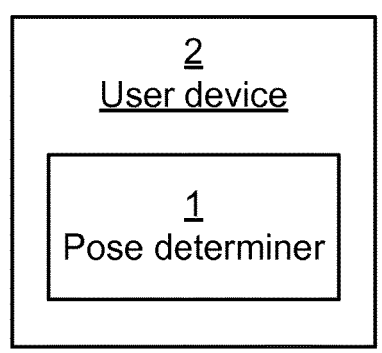
FIGS. 2A-B are schematic diagrams illustrating embodiments of where pose determiner can be implemented.
Figure 2B:
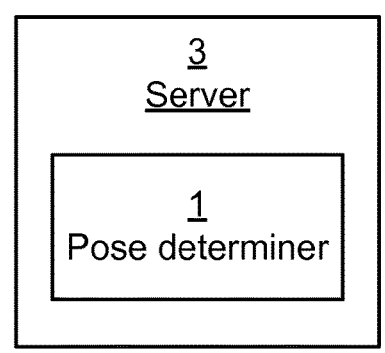

FIGS. 2A-B are schematic diagrams illustrating embodiments of where pose determiner 1 can be implemented. The pose determiner 1 is a device that determines the content pose for virtual content. The pose determiner 1 can be implemented as a stand-alone device or it can form part of a host device, as shown in FIGS. 2A-B.

In FIG. 2A, the pose determiner is implemented in the user device 2. The user device 2 is thus the host device for the pose determiner 1. In such an embodiment, the pose determiner is provided with poses from one or more anchoring devices, and retrieves relevant poses from within the user device.

In FIG. 2B, the pose determiner is implemented in the server 3. The server 3 is thus the host device for the pose determiner 1. In such an embodiment, the pose determiner is provided with poses not only from one or more anchoring devices, but also from the user device.

Figure 3A:
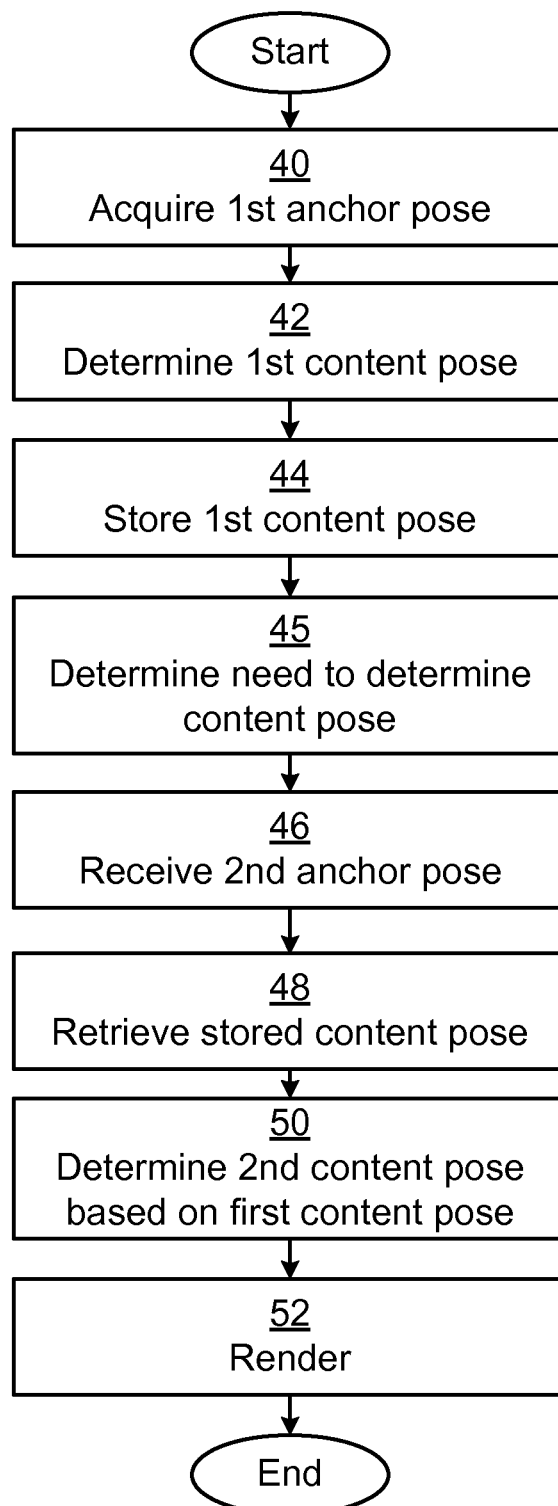
FIGS. 3A-B are flow charts illustrating embodiments of methods for determining a content pose of a piece of virtual content.
Figure 3B:
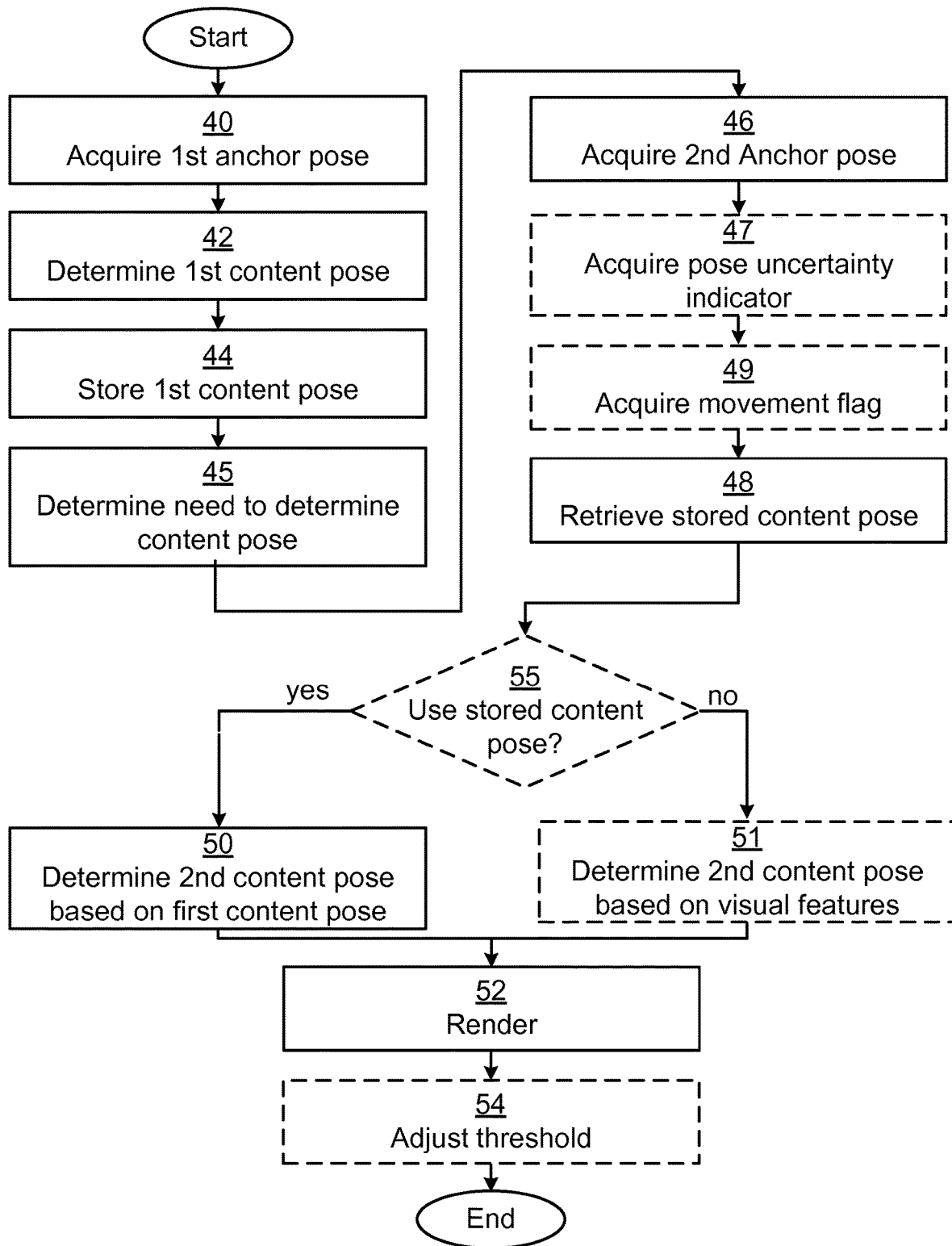

FIGS. 3A-B are flow charts illustrating embodiments of methods for determining a content pose of a piece of virtual content. The methods are performed in the pose determiner.

The method starts when a need is detected to anchor a piece of virtual content. It is to be noted that, while the steps below refer to a particular piece of virtual content, all steps referring to the piece of virtual content can be extended to apply for multiple pieces of virtual content.

In an acquire first anchor pose step 40, the pose determiner acquires a first anchor pose of the anchoring device, e.g. forming part of a signal received from the anchoring device over a wireless communication channel. This can be achieved by receiving the first anchor pose in a coordinate system of the anchoring device, and determining the first anchor pose in a coordinate system of the user device.

In other words, the anchoring device transmits its first anchor pose to the pose determiner, the first anchor pose being in the anchoring device coordinate system. We denote this pose by P(a, a).

The pose determiner can then determine the pose of the anchoring device in the user device coordinate system, which we denote by P(a,u). Such determination can be performed using various positioning technologies and methods proposed in the art per se, such as via visual means (e.g. passive or active marker-based or non-marker based methods), radio-based means (e.g.

WiFi, Ultra Wide Band, GPS (Global Positioning System), etc.), audio means, electromagnetic means, etc.

Based on knowing P(a, a) and P(a, u), the transform matrix Tua (coordinate system transform from user device to anchor device) can be calculated, which relates both poses, i.e. P(a, a)=Tua*P(a, u). In order to determine a robust value of Tua, various poses P(a, u) can be determined, and e.g. a least squares estimate of Tua considering various P(a, u) values can be performed.

In a determine first content pose step 42, the pose determiner determines a first content pose. The first content pose is a pose of a piece of virtual content, in relation to the first anchor pose. This can be achieved by determining the first content pose in the coordinate system of the anchoring device prior to storing.

This can be calculated according to the following. Since the transform matrix Tua is known, the first content pose of the piece of virtual content can be transformed to the user device coordinate system into the anchoring device coordinate system by performing the following calculation: P(v, a)=Tua*P(v, u).

The value of P(v, a) can now be used as an anchor for the piece of virtual content to the anchoring device.

The same operations can be performed for visual features found in the environment as P(vf, a), where of denotes "visual features".

In a store first content pose step 44, the pose determiner stores the first content pose in relation to the first anchor pose, for instance in the coordinate system of the anchoring device.

In a determine need to determine content pose step 45, the pose determiner determines that the user device needs to determine a content pose of the piece of virtual content. The need to determine content pose can be triggered by the enablement of a user device, e.g. the device is turned on, the user requests virtual content from the current location to be loaded, or the user re-entering a physical space where anchoring, as described herein, has previously been executed.

In a receive second anchor pose step 46, the pose determiner acquires a second anchor pose of the anchoring device. The second anchor pose can be received in a coordinate system of the anchoring device. The second anchor pose is denoted P'(a, a). When the anchoring is an essentially static device, such as a smart fridge, the second anchor pose will most likely be the same as the first anchoring pose, while if the anchoring device is more moveable, such as a smart lamp, it is more likely that the anchoring device has moved, implying that the second anchor pose differs from the first anchor pose.

In a retrieve stored content pose step 48, the pose determiner retrieves the stored first content pose, i.e. P(v, a).

In a determine second content pose based on first content pose step 50, the pose determiner determines a second content pose of the piece of virtual content based on the first content pose and the second anchor pose. This can be achieved by determining the pose of the anchoring device in the coordinate system of the user device.

The pose determiner first determines the anchoring device's pose in the user device coordinate system P'(a, u) with respect to the user device coordinate system using techniques and methods known in the art per se.

A new transformation between the two coordinate systems Tua' can then be computed as performed above, i.e. P'(a, a)=Tua'*P'(a, u). As a side note, if the coordinate systems of the anchoring device and the user device remain the same, the transform will still be the same in which case Tua' will be the same as Tua.

The pose of the piece of virtual content with respect to the user device coordinate system can then be determined as P'(v, u)=Tua'$^{-1}$*P(v, a), where P(v, a) has been retrieved from storage.

In a render step 52, the pose determiner renders the piece of virtual content in the second content pose on a user device comprising a display. This can comprise triggering the actual rendering to occur on a separate device, for instance when the pose determiner is implemented in the server and the rendering is performed using the user device.

Hence, the user device displays the piece of virtual content using the pose P'(v, u). The display is achieved without resorting to the visual matching as in the prior art.

Looking now to FIG. 3B, only new or modified steps compared to the steps of FIG. 3A will be described.

In an optional acquire pose uncertainty indicator step 47, the pose determiner acquires a pose uncertainty indicator. The pose uncertainty indicator indicates a degree of uncertainty of the pose of the anchoring device. As explained in more detail below, the uncertainty indicator can be used for determining if the determination of content pose described above is to be used or if a conventional method (based on visual features) is instead to be used.

The uncertainty indicator can be computed according to various methods, which depend on the positioning technology used. As an example, if the anchoring device possesses an IMU to calculate its pose, an IMU is affected by noise which can introduce a position drift which is proportional to the squared rate and duration of acceleration. Hence, whenever the anchoring device moves, the uncertainty of its pose grows.

The uncertainty indicator can be given separately with respect to the position (x, y, z) and orientation (roll, pitch, yaw). This is due to different sensors with different estimation quality can be used to calculate position and orientation, and the anchoring device can change its position and not the orientation, or vice versa.

In an optional acquire movement flag step 49, the pose determiner acquires a movement flag indicating that the anchoring device has moved since capturing of the first anchor pose. The movement flag can be determined using other, simpler sensors, as e.g. a contact sensor in a docking station, than an IMU. Of course, the movement flag can also be determined using an IMU. The use of a contact sensor in a docking station can be exploited to reset any detected movement. For instance, if a laptop computer comprising an IMU acts as an anchoring device, its movement, once undocked, can be detected using the IMU. Once the laptop computer docks again, all the movement is reset and the movement flag can be set to 'no movement', regardless of possible accumulated inaccuracies and uncertainties introduced by IMU measurements.

It is to be noted that step 47 can be performed without performing step 49 and vice versa, or both steps can be performed.

In an optional conditional use stored content pose step 55, the pose determiner determines whether to use the stored content pose or not. This can be based on the uncertainty indicator, such that when the uncertainty indicator is less than a threshold value (i.e. less uncertain than a certain threshold), it is determined to use the stored content. In one embodiment when multiple anchoring devices are available, the anchoring device(s) with the lowest uncertainty is used for the determination in this step and subsequently in the method.

The threshold value can depend on the piece of virtual content, e.g. the type and properties of the piece of virtual content. As an example, if the piece of virtual content relates to an item of a dynamic game which the user has played in the living room and the item of the game should be displayed again when re-entering the physical space, it can be allowed that the game object is up to 50 cm away from its original position. Moreover, such an can be allowed to have no maximum allowed orientation error, since it might not matter what the orientation of the object is. On the other hand, a virtual plant on top of a table might not be allowed to have errors larger than to cm and the orientation error can be small to ensure the flower of the virtual plant points in the right direction. In other words, dynamic content can be configured to allow greater uncertainty than static content. Also, the threshold value can be a composite value, which is considered independently for position and orientation.

Alternatively or additionally, the determination of whether to use the stored content pose is further based also on the movement flag, e.g. when no movement of the anchoring device has occurred, then it is determined to use the stored content pose. When there are multiple anchoring devices, the anchoring device(s) which have not moved can be prioritised (e.g. by ignoring other anchoring device(s)).

The uncertainty indicator can be reset whenever the anchor pose is reported to the pose determiner (step 40 and step 46), since at such instants, the device can reset its pose and hence its uncertainty.

When it is determined to use the stored content pose, the method proceeds to the determine second content pose based on first content pose step 50. Otherwise, the method proceeds to an optional determine second content pose based on visual features step 51.

In the optional determine second content pose based on visual features step 51, the pose determiner determines the second content pose based on visual features. The visual features are captured by a camera of the user device. The visual features are matched with corresponding stored feature poses to determine the second pose of the piece of virtual content.

This step may need to be performed when the second content pose obtainable by means of the anchoring device is not good enough.

The pose of the visual features with respect to the user device coordinate system can then be determined as $P'(vf, u) = Tua^{-1} * P(vf, a)$.

However, even if uncertain, the knowledge of the pose of the visual features allows the pose determiner to significantly narrow the search space for both the visual features to search for and their expected location, making also the visual matching of step 51 significantly faster and more computationally efficient and hence more energy efficient than in the prior art.

In an optional adjust threshold step 54, the pose determiner adjusts the threshold based on an identified repositioning of the piece of virtual content. For instance, the threshold can be adjusted dynamically according to a recognized user interaction. As an example, if the user repositions the piece of virtual content after it is displayed, the threshold is reduced, according to the user adjustment. Such a threshold reduction does not need to completely correspond to the user adjustment, but can, over time make up the user adjustment. For instance, if the user adjusted the pose of the piece of virtual content by X, i.e. X=|Padjusted(v,u)−Poriginal(v,u)|, then the threshold is adjusted as threshold=threshold−(X/N), where N>1. In this way, the threshold is adjusted to become incrementally more strict. N is configurable and can be set to any value to control the aggressiveness of the threshold adjustment. A lower N implies a more aggressive threshold adjustment.

Optionally, the time it takes for the user to make the adjustment is considered when the threshold is adjusted. For example, a fast adjustment implies that the adjustment is significant and important to the user, in which case the threshold is adjusted more aggressively. On the other hand, if the user adjustment takes a long time, this indicates that the adjustment is of less significance, in which case the threshold is adjusted less aggressively or even not at all.

Another similar option which disregards how much the user has adjusted the piece of virtual content is that threshold=threshold/N, where N>1. The threshold can also be adjusted based on an automated adjustment, i.e. adjustments not made by the user. For instance, a visual feature matching using the camera images can be triggered sporadically or periodically (since these might be used for SLAM) to check if virtual content has the correct pose with respect to the real world. This can be checked by comparing the pose of the virtual content to visual features that have been stored. If the discrepancy is too large, for the type of virtual content and/or application, the threshold is adjusted.

Figure 4:
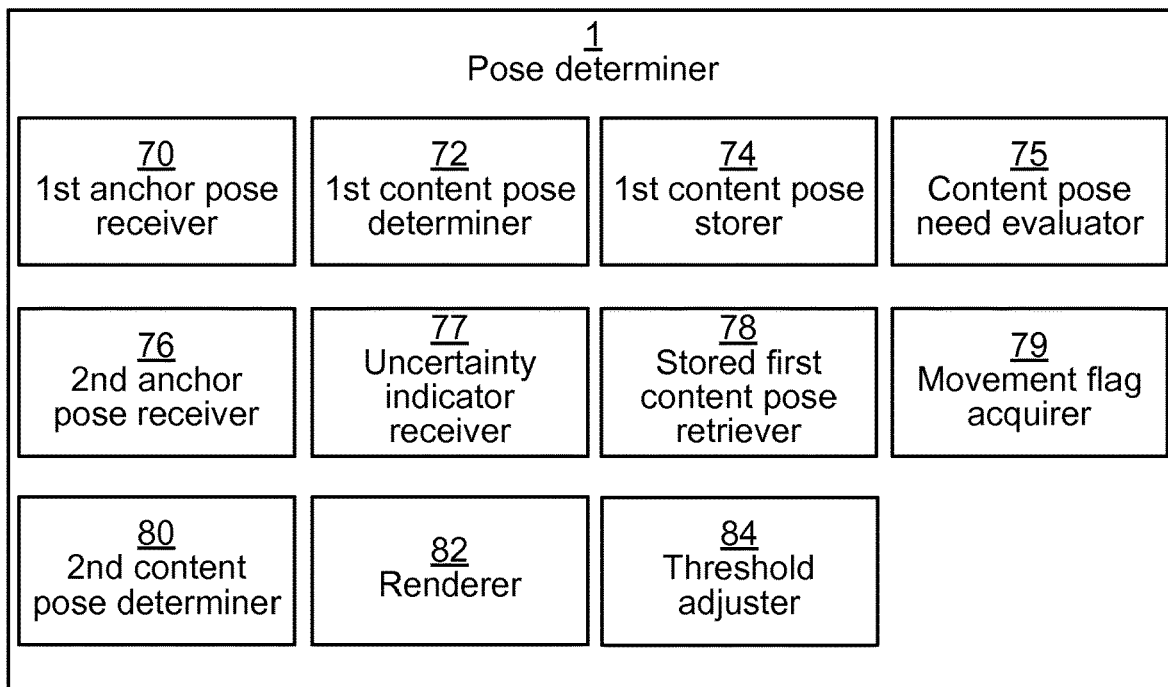
FIG. 4 is a schematic diagram showing functional modules of the pose determiner 1 of FIG. 2A-B according to one embodiment.

FIG. 4 is a schematic diagram showing functional modules of the pose determiner 1 of FIG. 2A-B according to one embodiment. The modules are implemented using software instructions such as a computer program executing in the pose determiner 1. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 3A and 3B.

A first anchor pose receiver 70 corresponds to step 40. A first content pose determiner 72 corresponds to step 42. A first content pose storer 74 corresponds to step 44. A content pose need evaluator step 75 corresponds to step 45. A second anchor pose receiver 76 corresponds to step 46. An uncertainty indicator receiver 77 corresponds to step 47. A stored first content pose retriever 78 corresponds to step 48. A movement flag acquirer 79 corresponds to step 49. A second content pose determiner 80 corresponds to step 50 and step 51. A renderer 82 corresponds to step 52. A threshold adjuster 84 corresponds to step 54.

Figure 5:
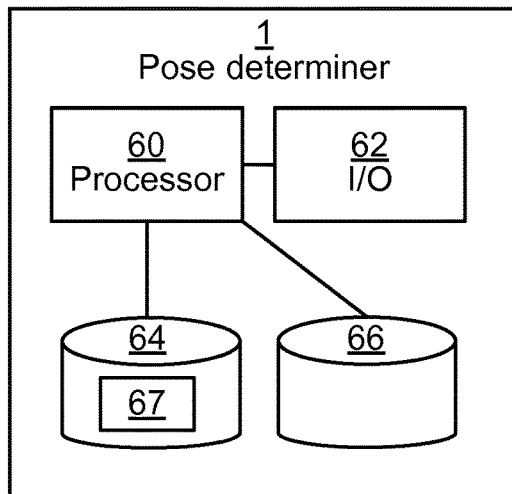
FIG. 5 is a schematic diagram illustrating components of the pose determiner 1 of FIGS. 2A-B.

FIG. 5 is a schematic diagram illustrating components of the pose determiner 1 of FIGS. 2A-B. It is to be noted that one or more of the mentioned components can be shared with the host device, such as the user device or server, when applicable. A processor 60 is provided using any combination of one or more of a suitable central processing unit (CPU), multiprocessor, microcontroller, digital signal processor (DSP), application specific integrated circuit etc., capable of executing software instructions 67 stored in a memory 64, which can thus be a computer program product. The processor 60 can be configured to execute the method described with reference to FIG. 3A-B above.

The memory 64 can be any combination of random access memory (RAM) and read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of random access memory (RAM) and read only memory (ROM).

The pose determiner 1 further comprises an I/O interface 62 for communicating with other external entities. Optionally, the I/O interface 62 also includes a user interface.

Other components of the pose determiner 1 are omitted in order not to obscure the concepts presented herein.

Figure 6:
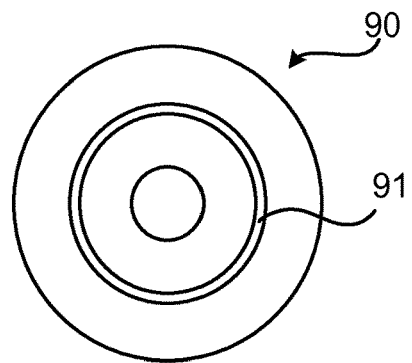
FIG. 6 shows one example of a computer program product comprising computer readable means.

FIG. 6 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 5. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method comprising the steps of:
acquiring a first anchor pose of an anchoring device;
determining a first content pose, in relation to the first anchor pose, the first content pose being a pose of a piece of virtual content;
storing the first content pose;
determining that a user device needs to determine a content pose of the piece of virtual content;
retrieving the stored first content pose of the piece of virtual content;
determining whether a condition is satisfied;
as a result of determining that the condition is satisfied, determining a second content pose of the piece of virtual content based on the first content pose of the piece of virtual content, or, as a result of determining that the condition is not satisfied, determining the second content pose of the piece of virtual content based on visual features captured by a camera of the user device; and
rendering the piece of virtual content using the second content pose.

2. The method of claim 1, further comprising:
acquiring a pose uncertainty indicator, the pose uncertainty indicator indicating a degree of uncertainty of the pose of the anchoring device, wherein
determining whether the condition is satisfied comprises comparing the pose uncertainty indicator to a threshold value.

3. The method of claim 2, wherein the threshold value depends on the piece of virtual content.

4. The method of claim 2, further comprising the step of:
adjusting the threshold based on an identified repositioning of the piece of virtual content.

5. The method of claim 2,
wherein determining whether the condition is satisfied further comprises determining whether the anchoring device has moved since acquiring the first anchor pose.

6. The method of claim 1,
wherein determining whether the condition is satisfied comprises determining whether the anchoring device has moved since acquiring the first anchor pose.

7. The method of claim 1, further comprising:
acquiring a second anchor pose of the anchoring device;
determining a transform matrix using the first anchor pose of the anchoring device and the second anchor pose of the anchoring device, wherein the first anchor pose is defined in a first coordinate system and the second anchor pose is defined in a second coordinate system; and
acquiring a third content pose of the piece of virtual content the third content pose being defined in said second coordinate system, wherein
determining the first content pose of the piece of virtual content comprises calculating the first content pose using the determined transform matrix and the third content pose, and
the first content pose is defined in said first coordinate system.

8. The method of claim 1, wherein
the condition is satisfied, and
determining the second content pose based on the first content pose comprises determining the second content pose (P2) using a transform matrix (Tua) and the first content pose (P1).

9. The method of claim 8, wherein determining P2 comprises calculating P2=Tua×P1.

10. The method of claim 9, wherein Tua=$T^{-1}$, and
T is a matrix determined using the first anchor pose of the anchoring device or a second anchor pose of the anchoring device.

11. The method of claim 1, wherein
the first content pose of the piece of virtual content is a first vector comprising a first set of coordinates defining a point in a first coordinate system; and
the second content pose of the piece of virtual content is a second vector comprising a second set of coordinates defining a point in a second coordinate system.

12. The method of claim 11, wherein
the first vector further comprises a first set of orientation values specifying an orientation of the piece of virtual content in the first coordinate system, and
the second vector further comprises a second set of orientation values specifying an orientation of the piece of virtual content in the second coordinate system.

13. A pose determiner for determining a content pose of a piece of virtual content, the pose determiner comprising:
a processor; and
a memory storing instructions that, when executed by the processor, cause the pose determiner to:
acquire a first anchor pose of an anchoring device;
determine a first content pose in relation to the first anchor pose, the first content pose being a pose of a piece of virtual content;
store the first content pose;
determine that a user device needs to determine a content pose of the piece of virtual content;
retrieve the stored first content pose of the piece of virtual content;
determine whether a condition is satisfied;
if the condition is determined to be satisfied, determine a second content pose of the piece of virtual content based on the first content pose, otherwise determine the second content pose of the piece of virtual content based on visual features captured by a camera of the user device; and
render the piece of virtual content using the second content pose.

14. The pose determiner according to claim 13, further comprising instructions that, when executed by the processor, cause the pose determiner to:
acquire a pose uncertainty indicator, indicating a degree of uncertainty of the pose of the anchoring device, wherein
the pose determiner is configured to determine whether the condition is satisfied by performing a process for determining whether the conditions is satisfied, wherein the process comprises comparing the pose uncertainty indicator to a threshold value.

15. The pose determiner of claim 14, wherein the threshold value depends on the piece of virtual content.

16. The pose determiner of claim 14, further comprising instructions that, when executed by the processor, cause the pose determiner to: adjust the threshold based on an identified repositioning of the piece of virtual content.

17. The pose determiner of claim 14, wherein
the process for determining whether the conditions is satisfied further comprises determining whether the anchoring device has moved since acquiring the first anchor pose.

18. The pose determiner of claim 8, wherein
the pose determiner is configured to determine whether the condition is satisfied by performing a process for determining whether the conditions is satisfied, wherein the process comprises determining whether the anchoring device has moved since acquiring the first anchor pose.

19. The pose determining of claim 13, wherein the pose determiner is configured to:
acquire a second anchor pose of the anchoring device;
determine a transform matrix using the first anchor pose of the anchoring device and the second anchor pose of the anchoring device, wherein the first anchor pose is defined in a first coordinate system and the second anchor pose is defined in a second coordinate system; and
acquiring a third content pose of the piece of virtual content the third content pose being defined in said second coordinate system, wherein
the poser determiner is configured to determine the first content pose of the piece of virtual content by calculating the first content pose using the determined transform matrix and the third content pose, and
the first content pose is defined in said first coordinate system.

20. A computer program product comprising a non-transitory computer readable medium storing a computer program for determining a content pose of a piece of virtual content, the computer program comprising computer program code which, when run on a pose determiner causes the pose determiner to:
acquire a first anchor pose of an anchoring device;
determine a first content pose in relation to the first anchor pose, the first content pose being a pose of a piece of virtual content;
store the first content pose;
determine that the user device needs to determine a content pose of the piece of virtual content;
retrieve the stored first content pose of the piece of virtual content;
determine whether a condition is satisfied;
if the condition is determined to be satisfied, determine a second content pose of the piece of virtual content based on the first content pose, otherwise determine the second content pose of the piece of virtual content based on visual features captured by a camera of the user device; and
render the piece of virtual content using the second content pose.

* * * * *